US009869583B1

(12) United States Patent
Yujiri et al.

(10) Patent No.: US 9,869,583 B1
(45) Date of Patent: Jan. 16, 2018

(54) IMAGE SCANNING ON A SPARSELY POPULATED FOCAL PLANE ARRAY TO ACHIEVE NYQUIST SAMPLING

(71) Applicant: Northrop Grumman Systems Corporation, Falls Church, VA (US)

(72) Inventors: Mikio L. Yujiri, Manhattan Beach, CA (US); Hiroshi Agravante, Long Beach, CA (US); John C. Donovan, Norwalk, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/335,500

(22) Filed: Oct. 27, 2016

(51) Int. Cl.
  *G01J 1/00* (2006.01)
  *G01J 1/44* (2006.01)

(52) U.S. Cl.
  CPC ........... *G01J 1/44* (2013.01); *G01J 2001/448* (2013.01)

(58) Field of Classification Search
  CPC .... G01S 3/44; H04N 5/2259; H04N 5/23238; H04N 9/12; H04N 5/217; H04N 5/33
  See application file for complete search history.

(56) References Cited

U.S. PATENT DOCUMENTS

| | | | | |
|---|---|---|---|---|
| 4,362,938 A * | 12/1982 | Bosserman | ............... | H04N 5/33 250/332 |
| 4,819,068 A * | 4/1989 | Cooper | ................... | H04N 5/33 348/164 |
| 5,129,595 A * | 7/1992 | Thiede | ................... | F41G 7/2213 244/3.16 |
| 5,227,800 A * | 7/1993 | Huguenin | ............... | G01S 7/024 250/332 |
| 5,999,122 A * | 12/1999 | Shoucri | ..................... | G01S 3/44 250/332 |
| 6,377,207 B1 * | 4/2002 | Solheim | .................. | G01W 1/02 324/640 |
| 7,548,185 B2 | 6/2009 | Sheen et al. | | |
| 8,213,672 B2 | 7/2012 | Daly et al. | | |
| 2012/0081511 A1 | 4/2012 | Kasunic et al. | | |
| 2014/0091965 A1 | 4/2014 | Sheen | | |

FOREIGN PATENT DOCUMENTS

CN  102087358  6/2011

OTHER PUBLICATIONS

A. Neto, "Leaky lens based UWB focal plane arrays for sub-mm wave imaging based on kinetic inductance detectors," Mar. 2009, Antennas and Propagations, EuCAP 2009, 3$^{rd}$ Eupropean Conference on, 3 pages.*

(Continued)

*Primary Examiner* — Kiho Kim
(74) *Attorney, Agent, or Firm* — Patti & Malvone Law Group, LLC

(57) ABSTRACT

An apparatus includes: a focal plane array (FPA) of receivers for a passive millimeter wave camera, the FPA comprising: receivers configured to sample an image, the image comprising one or more regions, the receivers arranged in an array of dimensions m rows by n columns, and a scanning reflector configured to move, thereby moving an image of the scene across the FPA transverse to the receiver columns.

22 Claims, 9 Drawing Sheets

(56) References Cited

OTHER PUBLICATIONS

Wang et al., "Planar high-gain antipodal linearly tapered slot antenna for passive millimeter-wave focal plane array imaging," 2013, Phased Array Systems & Technology, 2013 IEEE International Symposium on, pp. 267-271.*

Rappaport et al., "Advanced portal-based multistatic millimeter-wave radar imaging for person security screening," 2014, International Carhanhan Conference on Security Technology, 5 pages.*

Qiao, L. et al; Compressive sensing for direct millimeter-wave holographic imaging; Applied optics 54, No. 11 (2015); pp. 3280-3289.

Grossman, E. N. et al; Imaging with modular linear arrays of cryogenic Nb microbolometers; In SPIE Defense and Security Symposium; pp. 694806-694806. International Society for Optics and Photonics, 2008.

Salmon, N. A.; W-band real-time passive millimeter-wave imager for helicopter collision avoidance; In AeroSense'99, pp. 28-32; International Society for Optics and Photonics, 1999.

* cited by examiner

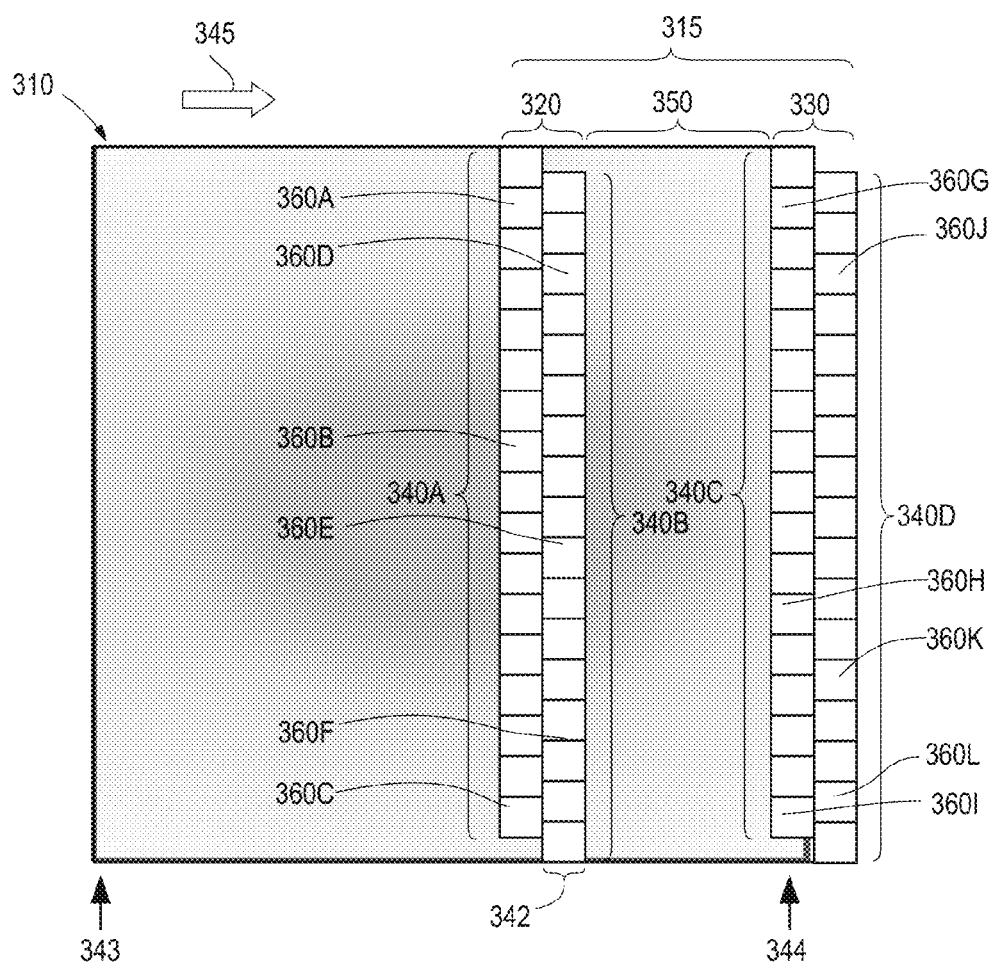

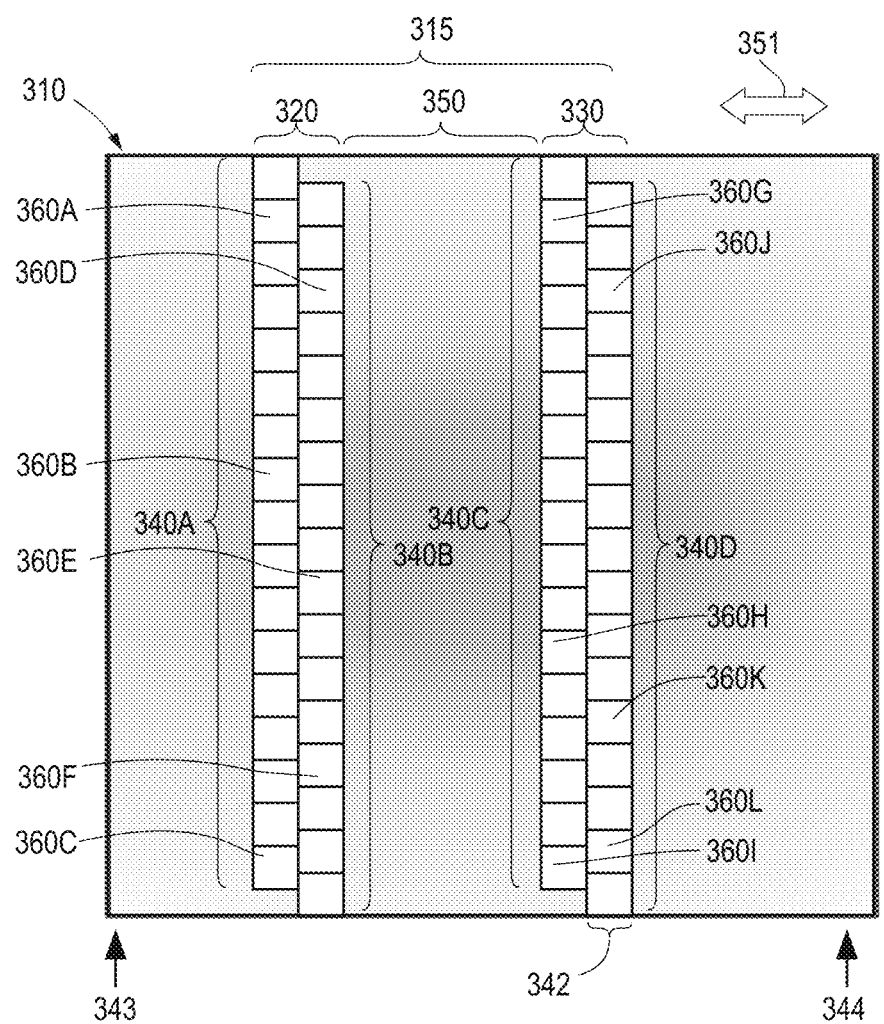

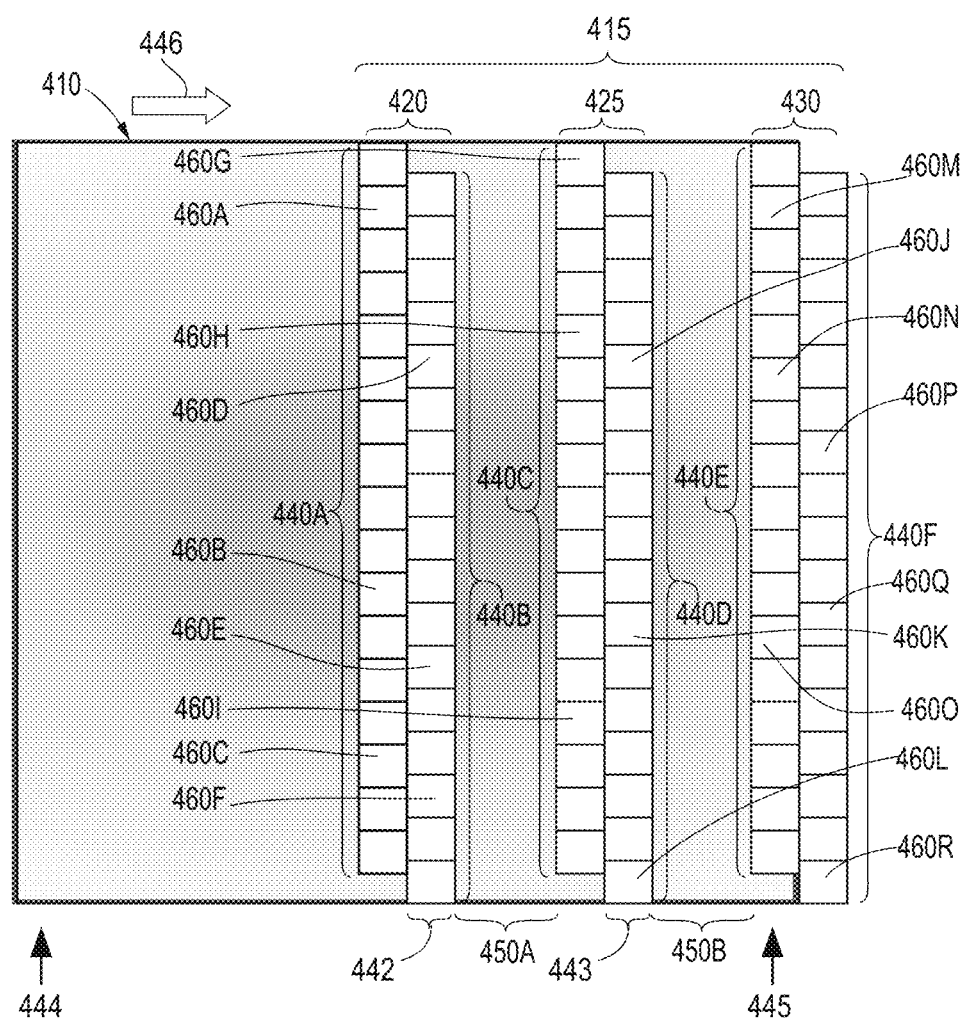

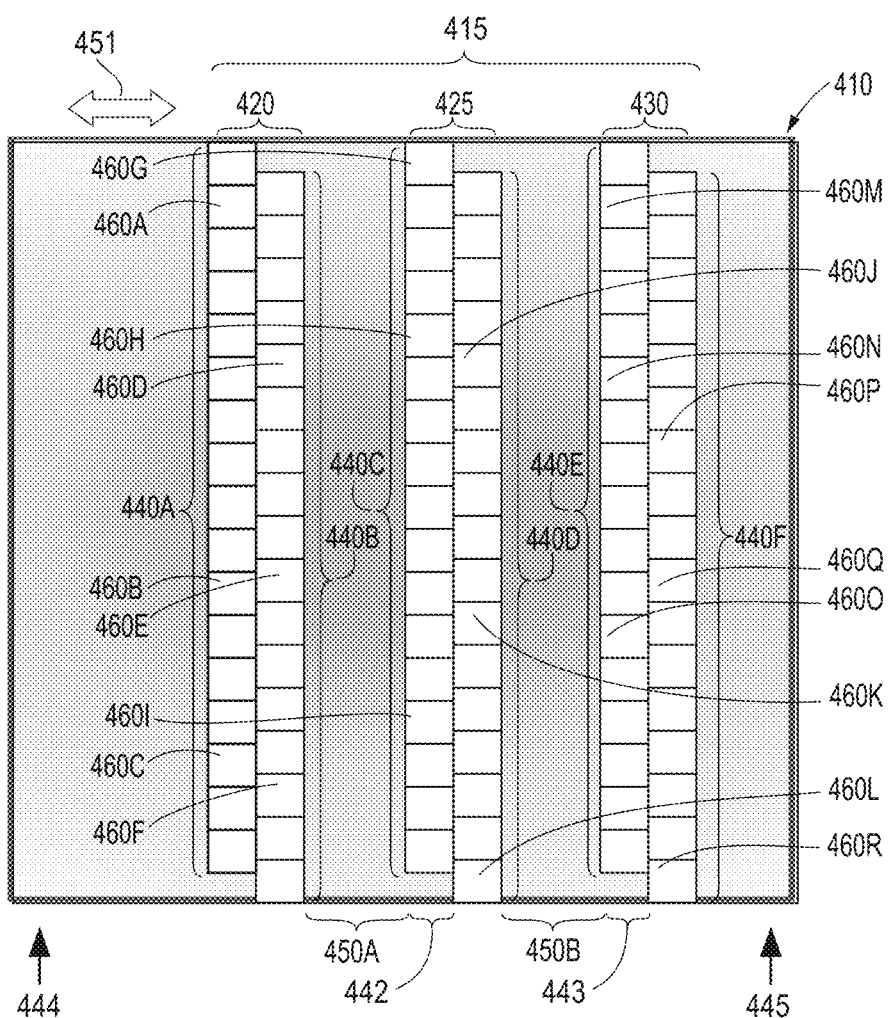

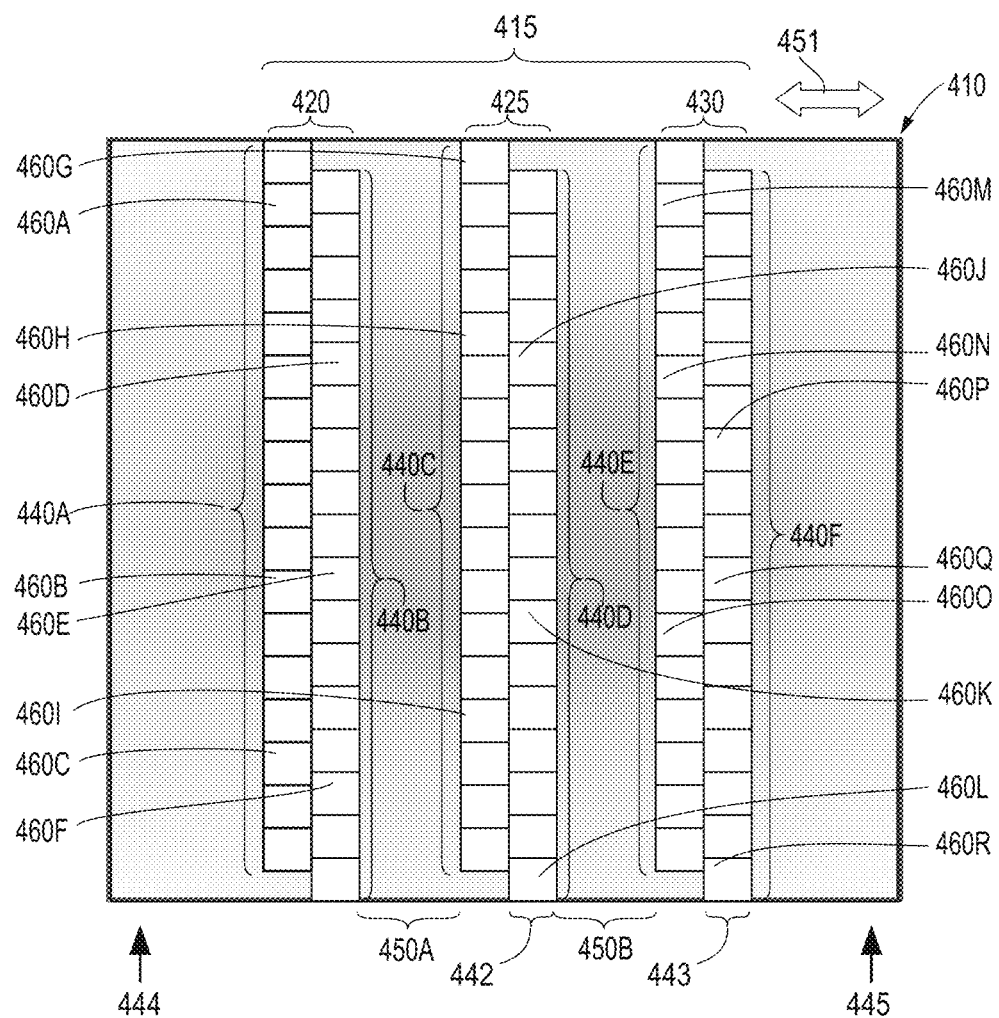

IMAGE SCANNING ON A SPARSELY POPULATED FOCAL PLANE ARRAY TO ACHIEVE NYQUIST SAMPLING

SUMMARY

An apparatus includes: a focal plane array (FPA) of receivers for a passive millimeter wave camera, the FPA comprising: receivers configured to sample an image, the image comprising one or more regions, the receivers arranged in an array of dimensions m rows by n columns, and a scanning reflector configured to move, thereby moving an image of the scene across the FPA transverse to the receiver columns.

CROSS-REFERENCE TO RELATED APPLICATION

This application contains subject matter that is related to the subject matter of the following applications, which are assigned to the same assignee as this application. The below-listed U.S. Patent application is hereby incorporated herein by reference in its entirety:
"COMPACT PASSIVE MILLIMETER WAVE (PMMW) CAMERA," by Yujiri, filed on Oct. 27, 2016, U.S. Ser. No. 15/335,494.

DESCRIPTION OF THE DRAWINGS

The accompanying drawings provide visual representations which will be used to more fully describe various representative embodiments and can be used by those skilled in the art to better understand the representative embodiments disclosed herein and their advantages. In these drawings, like reference numerals identify corresponding elements.

FIGS. 3A-3D are a set of schematic drawings of a focal plane array (FPA) for Nyquist sampling of an image, the FPA comprising two pairs of staggered receiver columns.

FIGS. 4A-4D are a set of schematic drawings of a focal plane array for Nyquist sampling comprising three pairs of staggered receiver columns.

DETAILED DESCRIPTION

Figure 1:
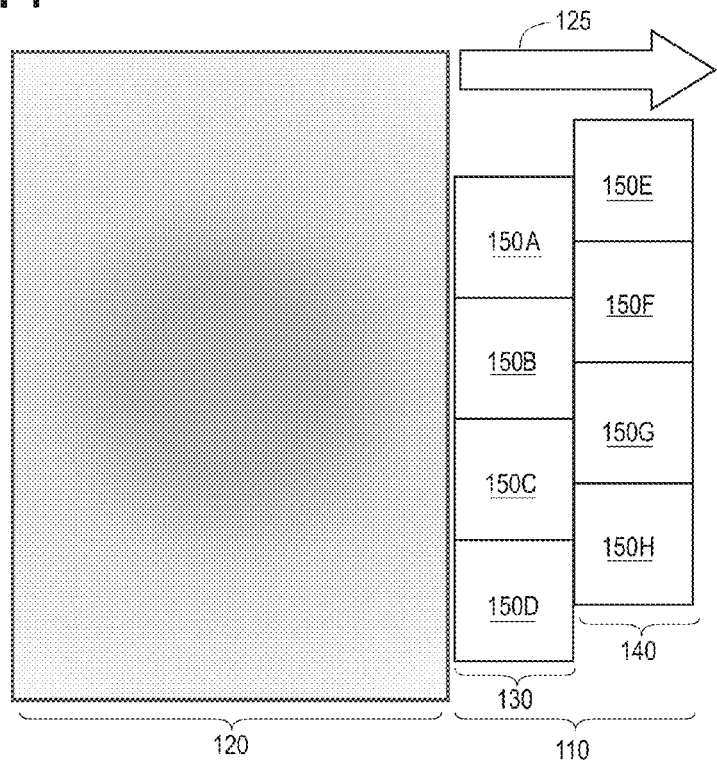
FIG. 1 is a schematic drawing of a focal plane array for Nyquist sampling.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

According to embodiments of the invention, a focal plane array (FPA) of receivers for a passive millimeter wave camera is provided. For example, the array comprises a rectangular array. For example, respective positions of two or more of the receivers in the array are staggered. For example, the receiver comprises an electronic device configured to perform one or more of collecting millimeter wave radiation, detecting millimeter wave radiation, and converting collected radiation into an electrical signal. For example, the receiver comprises an electronic device configured to collect the millimeter wave radiation, the receiver further configured to detect the millimeter wave radition, the receiver further configured to convert the collected radiation into an electrical signal. For example, the receiver is configured to convert the collected radiation into an electrical signal for purposes of creating an image of a scene in the millimeter wave regime.

For example, the FPA comprises receivers that are positioned with a substantially uniform pitch. Alternatively, or additionally, the positioning of the receivers can be shifted so as to alter the staggering of the receivers in the array. For example, the FPA comprises an array with m receivers in a horizontal direction (row) and n receivers in a vertical direction (column). That is, the FPA comprises an m×n array of receivers that can be used to generate an m×n array of pixels in an image display. The image comprises one or more regions.

According to further embodiments of the invention, strategic positioning of the receivers in the array can facilitate Nyquist sampling. Typically, although not necessarily, a scanning reflector moves, moving an image across the FPA transverse to the receiver columns. For example, the scanning reflector comprises one or more of a scanning mirror, a scanning twist reflector, a swivel plate, a rotating plate, and a Risley pair. For example, resultant motion of the image can be sinusoidal with a motion period $t_P$. Alternatively, or additionally, the resultant motion of the image can follow one or more other patterns, for example, one or more of triangular, square, and step-stare. That is, the image moves in a pattern that comprises one or more of a sinusoidal pattern, a triangular pattern, a square pattern, and a step-stare pattern.

The effect is similar and the image reconstruction is similar. For example, in selected receiver columns, the receivers are shifted over by an incremental fraction of the FPA pitch known as the pixel fraction. For example, in selected receiver columns, the receivers are shifted over in the direction of the column by the pixel fraction. For example, the pixel fraction does not change during a given scan of the image. For example, in selected receiver columns, the receivers are shifted over by approximately half a pixel. For example, the pixel fraction comprises approximately half a pixel. For example, in alternating receiver columns, the receivers are shifted over by approximately half a pixel. For example, the pixel fraction comprises an increment of less than half a pixel. For example, the pixel fraction comprises approximately a third of a pixel. For example, the pixel fraction comprises approximately a quarter pixel. For example, the pixel fraction comprises approximately a tenth of a pixel. According to other embodiments of the invention, one or more receiver columns of the array may be removed from the FPA, thereby creating a sparsely populated array. According to other embodiments of the invention, the scanning reflector can be exploited to compensate for the removed receiver columns.

A difficulty overcome by embodiments of the invention is that when removing columns of receivers from a fully populated FPA, there may be gaps in the image formed by the remaining receivers of the FPA. According to further embodiments of the invention, by properly choosing the receiver columns to be removed, a substantially complete image can be generated by scanning the image across the remaining receivers of the FPA and using the remaining receivers to record the image in the gaps between the remaining receiver columns.

According to further embodiments of the invention, by adjusting an angle through which the scanning reflector moves the image, certain receivers in separate columns will sample the same region of the image twice, thereby increasing an integration time at that point in the image to reduce noise in the image. According to other embodiments of the invention, if, for example, the scanning reflector motion is sinusoidal, the points at which the scanning reflector is reversing its direction of motion, where the image is moving most slowly, can be arranged so that receivers are positioned at this point, thereby maximizing the integration time on the image.

According to still further embodiments of the invention, a column of receivers can be located at a point where the image is moving over the column of receivers the fastest, but for a different point in the image, this point will be moving the slowest at a time that is later by approximately $t_F/4$. Thus, at different times, a given column of receivers can sample some parts of the image slowly while sampling other parts of the image quickly. These different samplings of the image can be combined to increase the integration time of the image capture. According to yet other embodiments of the invention, a non-uniform, larger integration time across the image is produced. Moreover, the sampling of the same region of the image by two or more receiver columns can allow a cross-calibration of receivers to help with one or more of calibration and image uniformity. The columns view the same point in the image at two times that are close to each other in time so that the region of the image sampled does not change significantly between the two samplings.

FIG. 1 is a schematic drawing of a focal plane array (FPA) 110 for Nyquist sampling. Depicted are the FPA 110 and an image 120 that moves in the direction indicated by the arrow 125 and that is to be scanned by the FPA 110. The FPA 110 comprises two receiver columns, a first receiver column 130 and a second receiver column 140.

The first receiver column 130 comprises a plurality of receivers 150. For example, the first receiver column 130 comprises a plurality of receivers 150. As depicted, the first receiver column 130 comprises four receivers 150A, 150B, 150C, and 150D. The receivers are indicated by square boxes, representing areas in which a given receiver collects radiation.

The second receiver column 140 comprises a plurality of receivers 150. For example, the second receiver column 140 comprises a plurality of receivers 150. As depicted, the second receiver column 140 comprises four receivers 150E, 150F, 150G, and 150H. The receivers are indicated by square boxes, representing areas in which a given receiver collects radiation. The second receiver column 140 is staggered relative to the first receiver column 130 by approximately half a pixel. The image 120 is moved across the FPA 110 using a scanning reflector (not shown). Alternatively, or additionally, the FPA 110 is moved across the image 120.

Figure 2:
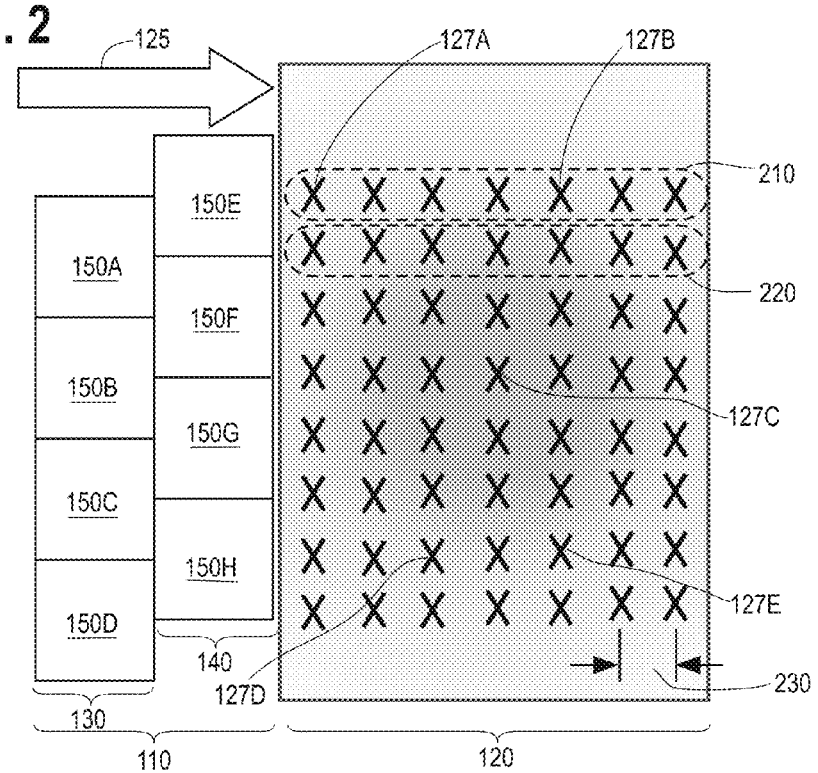
FIG. 2 is a schematic drawing of a focal plane array for Nyquist sampling.

FIG. 2 is a schematic drawing of a focal plane array (FPA) 110 for Nyquist sampling. Depicted are the FPA 110 and the image 120 that moves in the direction indicated by the arrow 125 and that is scanned by the FPA 110. This shows the result after the image 120 has been scanned across the FPA 110. As the FPA 110 scans the image 120, it generates image data points including image data points 127A, 127B, 127C, 127D, and 127E. As examples, the data points in the grouping 210 were collected by receiver 150E, and those in grouping 220 were collected by receiver 150A. The timing of these collections must be coordinated with the image motion so that the pitch 230 is equal to approximately half the spacing between columns 130 and 140 in the direction of the rows, or a half pixel in this figure. The result is a sampling of the image at half-pixel steps in both the column and the row directions, that is, a Nyquist sampled image. The FPA 110 comprises two receiver columns, a first receiver column 130 and a second receiver column 140. The first receiver column 130 is staggered relative to the second receiver column 140 by approximately half a pixel in the direction of the column.

The first receiver column 130 comprises a plurality of receivers 150. For example, the first receiver column 130 comprises a plurality of receivers 150. As depicted, the first receiver column 130 comprises four receivers 150A, 150B, 150C, and 150D.

The second receiver column 140 comprises a plurality of receivers 150. For example, the second receiver column 140 comprises a plurality of receivers 150. As depicted, the second receiver column 140 comprises four receivers 150E, 150F, 150G, and 150H. The image 120 is moved across the FPA 110 using a scanning reflector (not shown). Alternatively, or additionally, the FPA 110 is moved across the image.

FIGS. 3A-3D are a set of schematic drawings of a focal plane array (FPA) for Nyquist sampling of an image, the FPA comprising two pairs of staggered receiver columns.

FIG. 3A shows an image 310 that is sampled by a focal plane array (FPA) 315 for Nyquist sampling, comprising two pairs 320 and 330 of staggered receiver columns 340A, 340B, 340C, and 340D. The image 310 comprises an image region 342. The image 310 comprises a far left edge 343. The image 310 further comprises a far right edge 344. The image 310 is moved across the FPA 315 formed by receiver columns 340A, 340B, 340C, and 340D using a scanning reflector (not shown). The image 310 moves perpendicularly to the receiver columns 340A, 340B, 340C, and 340D, in the direction indicated by right arrow 345. A first pair 320 of receiver columns comprises receiver columns 340A and 340B. Receiver columns 340A and 340B are respectively staggered by approximately half a pixel. Similarly, a second pair 330 of receiver columns comprises receiver columns 340C and 340D. Receiver columns 340C and 340D are respectively staggered by approximately half a pixel. An evident gap 350 exists between the pairs 320 and 330 of receiver columns.

Receiver columns 340B, 340C and 340D will overlap their sampling of the image region 342 as the image 310 is moved in the direction of the right arrow 345. That is, receiver columns 340B, 340C, and 340D sample the same image region 342 at different times as the image 310 moves across the FPA 315. Receiver column 340B samples image region 342 in FIG. 3A; in FIG. 3B, receiver column 340C is sampling the image region 342; in FIG. 3C, receiver column 340D is sampling the image region 342; and in FIG. 3D, the image 310 has moved further to the right to the point that image region 342 is not sampled by any part of the FPA 315.

As depicted, in FIG. 3A, the image 310 has moved as far to the left as permitted, and is in position to reverse its direction of motion, that is, to move in the direction indicated by right arrow 350. A right point of motion reversal is defined so that both receiver columns 340C and 340D have sampled a far right edge 344 of the image 310 as the image 310 was moving to the left to reach this point of image motion reversal.

Figure 3B:
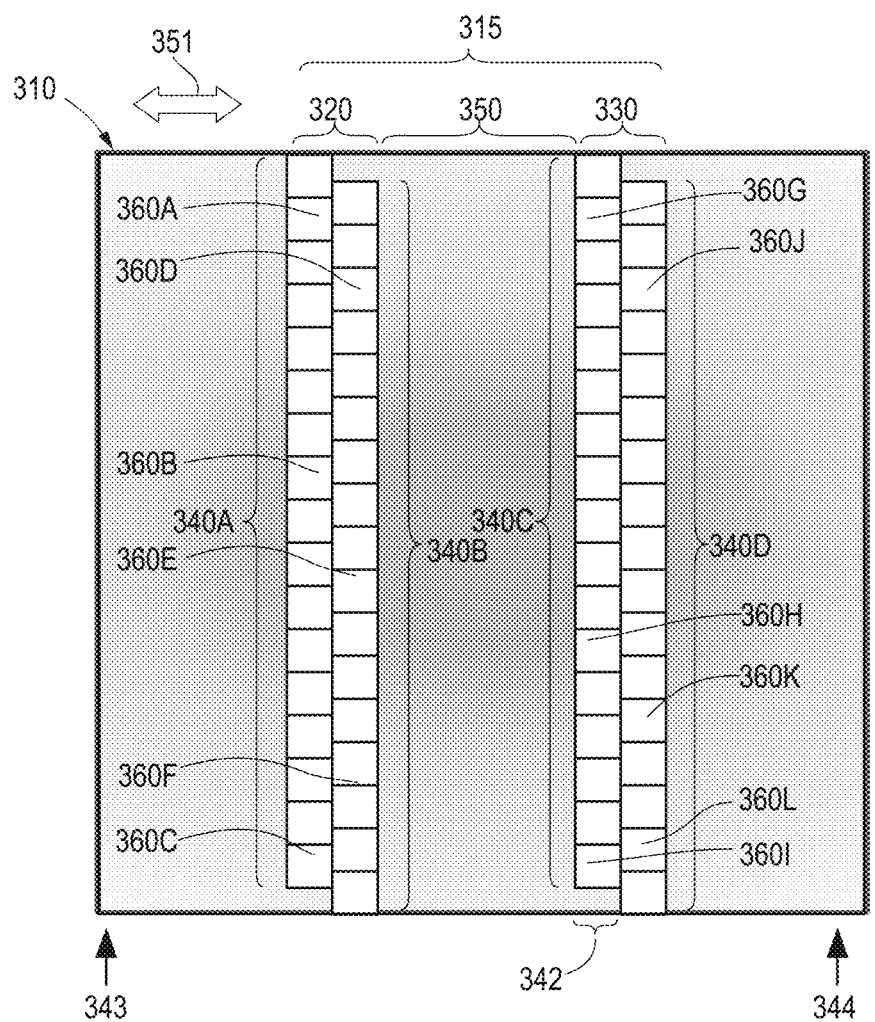

In FIGS. 3B and 3C, the receiver columns 340A-340D are located approximately in the middle of their permissible range of motion, so the image 310 can move either to the left or the right, as indicated by left-and-right arrow 351.

Figure 3D:
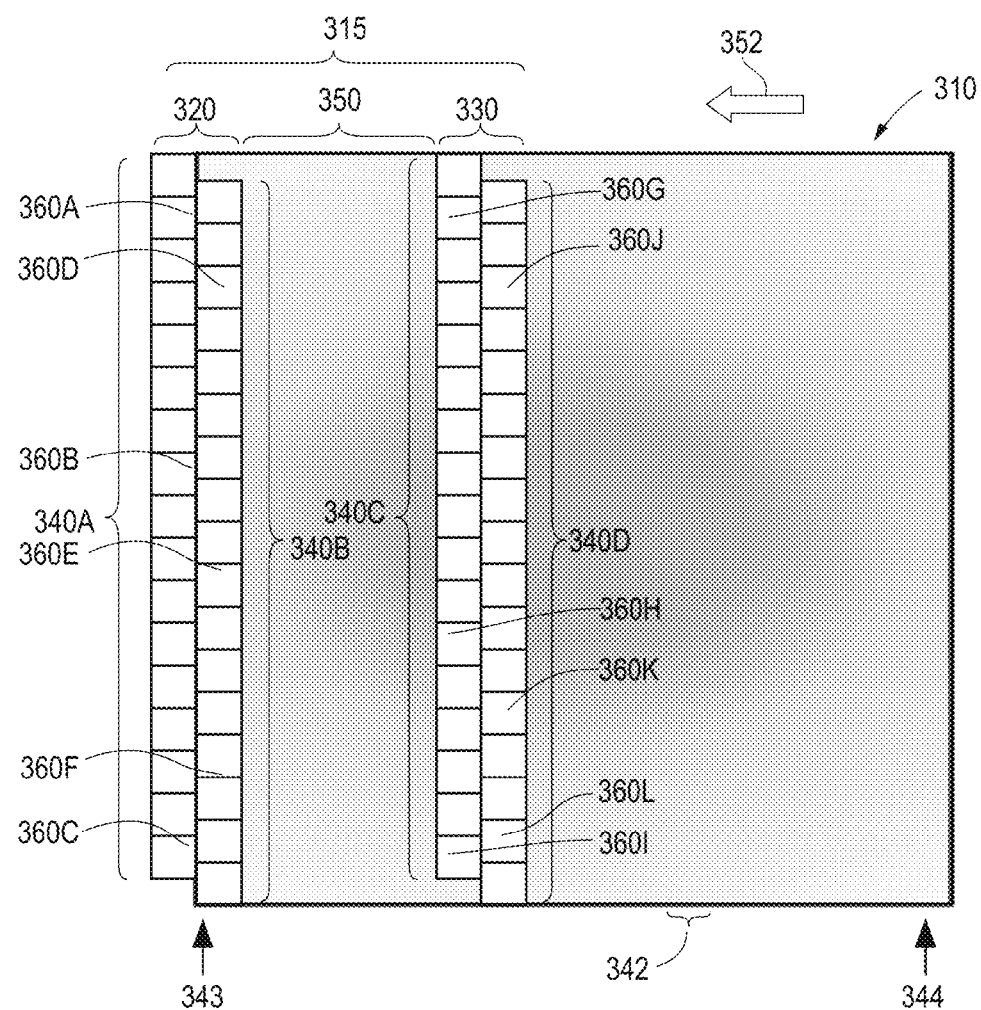

In FIG. 3D, the image 310 has moved as far to the right as permitted, and is in position to reverse its direction of motion, that is, to move in the direction indicated by left arrow 352. As in FIG. 3A, a left point of motion reversal is defined so that both receiver columns 340A and 340B have sampled the far left edge 343 of the image 310 as the image 310 was moving to the right to reach this point of image motion reversal.

The sampling of the image region 342 by receiver column 340B permits cross-calibration between a receiver 360 comprised in the receiver column 340B, for example, receiver 360D, and a receiver 360 comprised in the receiver column 340D, for example, receiver 360J. Receiver columns 360D and 360J view the same points in the image region 342 at different times during the motion of the image 310. The sampling of the image region 342 by receiver columns 340B and 340C in FIGS. 3A and 3B, respectively, permits Nyquist sampling of image region 342 in the column direction. Nyquist sampling in the row direction is accomplished by sampling the image 310 as it moves every half-pixel step in its motion, as described in FIG. 2 for the simpler case of a single pair of receiver columns.

The sampling of the image region 342 by receiver columns 340B and 340D in FIGS. 3A and 3C, respectively, permits cross-calibration between receivers in columns 340B and 340D that view the same points in the image region 342 at different times during the motion of the image 310, and the sampling of the image region 342 by receiver columns 340B and 340C in FIGS. 3A and 3B, respectively, permits Nyquist sampling of image region 342 in the column direction. Nyquist sampling in the row direction is accomplished by sampling the image 310 as it moves every half-pixel step in its motion, as described in FIG. 2 for the simpler case of a single pair of receiver columns.

In FIGS. 3A to 3D, the first receiver column 340A comprises a plurality of receivers including receivers 360A, 360B, and 360C. The second receiver column 340B comprises a plurality of receivers including receivers 360D, 360E, and 360F. The third receiver column 340C comprises a plurality of receivers including receivers 360G, 360H, and 360I. The fourth receiver column 340D comprises a plurality of receivers including receivers 360J, 360K, and 360L.

To fill in the information regarding the image 310 that would otherwise be lost due to the gap 350 shown in FIGS. 3A to 3D, the image 310 moves back and forth as indicated by the arrows 345, 351, and 352 so that to overcome the gap 350, the image 310 is sampled by one or more receiver columns 340A, 340B, 340C, and 340D that are comprised in the FPA 315.

For example, data obtained by the first pair 320 of receiver columns can be compared with data obtained by the second pair 330. For example, if a receiver in the first pair 320 measures a collected amount of millimeter wave radiation that is less than approximately 1% different than a collected amount of millimeter wave radiation measured by a receiver in the second pair 330 that viewed the same point in the image 310 at different times during the motion of the image 310, it can be assumed that the image 310 changed insignificantly in the time increment that elapsed between the sampling by the first pair 320 and the sampling by the second pair 330.

For example, a representative time increment between the samplings by the first pair 320 and the second pair 330 might be approximately $t_r/4$ or approximately 0.025 seconds if the scanning reflector (not shown) completes a scanning cycle in approximately 0.1 seconds, that is, if the scanning reflector is swiveling at a frequency of approximately 10 Hertz. If for a given point in the image 310 the change in the collected amount of millimeter wave radiation is small during this time increment, then a cross calibration can be done between the receiver in the first pair 320 and the receiver in the second pair 330 that viewed this given point in the image 310. For example, if for a given point in the image 310 the change in the collected amount of millimeter wave radiation during this time increment is less than approximately 1%, then a cross-calibration can be done between the receiver in the first pair 320 and the receiver in the second pair 330 that viewed this given point in the image 310.

FIGS. 4A-4D are a set of schematic drawings of a focal plane array (FPA) for Nyquist sampling of an image, the FPA comprising three pairs of staggered receiver columns.

FIG. 4A shows an image 410 that is sampled by a focal plane array (FPA) 415 for Nyquist sampling, comprising three pairs 420, 425, and 430 of staggered receiver columns 440A, 440B, 440C, 440D, 440E, and 440F. The image 410 comprises two image regions, a first image region 442 and a second image region 443. The image 410 further comprises a far left edge 444. The image 410 further comprises a far right edge 445. The image 410 is moved across the FPA 415 formed by receiver columns 440A, 440B, 440C, 440D, 440E, and 440F using a scanning reflector (not shown). The image 410 moves perpendicularly to the receiver columns 440A, 440B, 440C, 440D, 440E, and 440F, in the direction indicated by the right arrow 446. A first pair 420 of receiver columns comprises receiver columns 440A and 440B. Receiver columns 440A and 440B are respectively staggered by approximately half a pixel. Similarly, a second pair 425 of receiver columns comprises receiver columns 440C and 440D. Receiver columns 440C and 440D are respectively staggered by approximately half a pixel. Again, a third pair 430 of receiver columns comprises receiver columns 440E and 440F. Receiver columns 440E and 440F are respectively staggered by approximately half a pixel. An evident gap 450A exists between the first pair 420 of receiver columns and the second pair 425 of receiver columns. Similarly, an evident gap 450B exists between the second pair 425 of receiver columns and the third pair 430 of receiver columns.

Receiver columns 440B, 440C, 440D and 440F overlap their sampling of first image region 442 as the image 410 is moved in the direction of right arrow 446. That is, receiver columns 440B, 440C, 440D, and 440F sample the same first image region 442 at different times as the image 410 moves across the FPA 415. Receiver column 440B samples the first image region 442 in FIG. 4A; in FIG. 4B, receiver column 440C is sampling the first image region 442; in FIG. 4C, receiver column 440D is sampling the first image region 442; and in FIG. 4D, receiver column 440F is sampling the first image region 442.

Similarly, receiver columns 440D, 440E and 440F overlap their sampling of second image region 443. That is, receiver columns 440D, 440E, and 440F sample the same second image region 443 at different times as the image 410 moves across the FPA 415. Receiver column 440D samples the second image region 443 in FIG. 4A; in FIG. 4B, receiver column 440E is sampling the second image region 443; in FIG. 4C, receiver column 440F is sampling the second image region 443; and in FIG. 4D, the image 410 has moved further to the right to the point that the second image region 443 is not sampled by any part of the FPA 415.

As depicted, in FIG. 4A, the image 410 has moved as far to the left as permitted, and is in position to reverse its direction of motion, that is, to move in the direction indicated by right arrow 446. A right point of motion reversal is defined so that both receiver columns 440E and 440F have sampled a far right edge 445 of the image 410 as the image 410 was moving to the left to reach this point of image motion reversal.

In FIGS. 4B and 4C, the receiver columns 440A-440F are located approximately in the middle of their permissible range of motion, so the image 410 can move either to the left or the right, as indicated by left-and-right arrow 451.

Figure 4D:
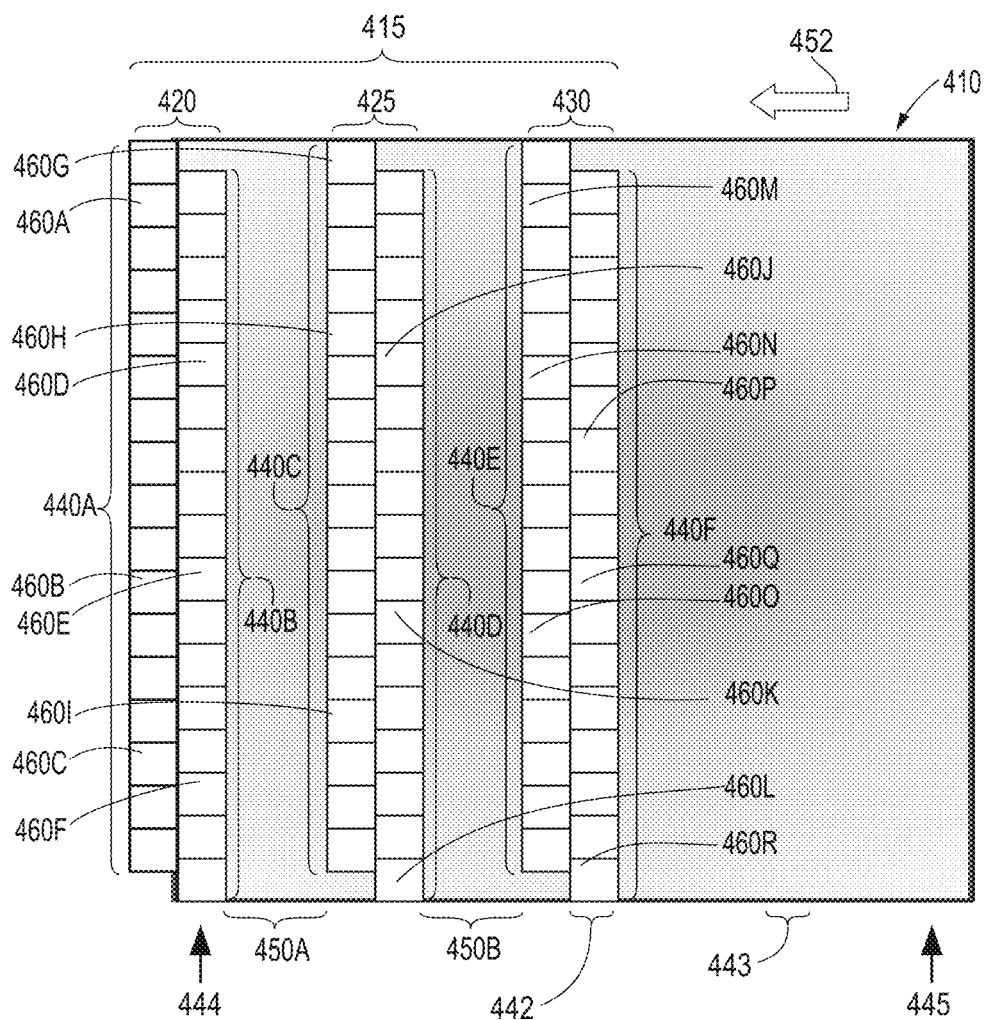

In FIG. 4D, the image 410 has moved as far to the right as permitted, and is in position to reverse its direction of motion, that is, to move in the direction indicated by a left arrow 452. As in FIG. 4A, a left point of motion reversal is defined so that both receiver columns 440A and 440B have sampled the far left edge 444 of the image 410 as the image 410 was moving to the right to reach this point of image motion reversal.

The sampling of the first image region 442 by receiver column 440B permits cross-calibration between a receiver 460 comprised in the receiver column 440B, for example, receiver 460D, and a receiver 460 comprised in the receiver column 440D, for example, receiver 460J. Receiver columns 460D and 460J view the same points in the first image region 442 at different times during the motion of the image 410. The sampling of the first image region 442 by receiver columns 440B and 440C in FIGS. 4A and 4B, respectively, permits Nyquist sampling of image region 442 in the column direction. Nyquist sampling in the row direction is accomplished by sampling the image 410 as it moves every half-pixel step in its motion, as described in FIG. 2 for the simpler case of a single pair of receiver columns. A similar description applies to the second image region 443.

The sampling of the first image region 442 by receiver columns 440B and 440D in FIGS. 4A and 4C, respectively, permits cross-calibration between receivers in columns 440B and 440D that view the same points in the first image region 442 at different times during the motion of image 410. Similarly, sampling of the first image region 442 by receiver columns 440D and 440F in FIGS. 4C and 4D, respectively permits cross-calibration between receivers in columns 440C and 440D that view the same points in the image region 442 at different times during the motion of image 410. The sampling of the first image region 442 by receiver columns 440B and 440C in FIGS. 4A and 4B, respectively, permits Nyquist sampling of image region 442 in the column direction. Nyquist sampling in the row direction is accomplished by sampling the image as it moves every half-pixel step in its motion, as described in FIG. 2 for the simpler case of a single pair of receiver columns.

The sampling of the second image region 443 by receiver columns 440D and 440F in FIGS. 4A and 4C, respectively, permits cross-calibration between receivers in columns 440D and 440F that view the same points in the image region 443 at different times during the motion of image 410. The sampling of the second image region 443 by receiver columns 440D and 440E in FIGS. 4A and 4B, respectively, permits Nyquist sampling of image region 443 in the column direction. Similarly, sampling of the second image region 443 by receiver columns 440E and 440F in FIGS. 4B and 4C, respectively, permits Nyquist sampling of image region 443 in the column direction. Nyquist sampling in the row direction is accomplished by sampling the image as it moves every half-pixel step in its motion, as described in FIG. 2 for the simpler case of a single pair of receiver columns.

In FIGS. 4A to 4D, the first receiver column 440A comprises a plurality of receivers including receivers 460A, 460B, and 460C. The second receiver column 440B comprises a plurality of receivers including receivers 460D, 460E, and 460F. The third receiver column 440C comprises a plurality of receivers including receivers 460G, 460H, and 460I. The fourth receiver column 440D comprises a plurality of receivers including receivers 460J, 460K, and 460L. The fifth receiver column 440E comprises a plurality of receivers including receivers 460M, 460N, and 460O. The sixth receiver column 440F comprises a plurality of receivers including receivers 460P, 460Q, and 460R.

To fill in the information regarding the image 410 that would otherwise be lost due to the one or more of the gaps 450A and 450B shown in FIGS. 4A to 4D, the image 410 moves back and forth as indicated by the arrows 446, 451, and 452 so that to overcome one or more of the gaps 450A and 450B, the image 410 is sampled by one or more receiver columns 440A, 440B, 440C, 440D, 440E, and 440F that are comprised in the FPA 415.

For example, data obtained by the second pair 425 of receiver columns can be compared with data obtained by the third pair 430. For example, if a receiver in the second pair 425 measures a collected amount of millimeter wave radiation that is less than 1% different than a collected amount of millimeter wave radiation measured by a receiver in the third pair 430 that viewed the same point in the image 410 at different times during the motion of image 410, it can be assumed that the image 410 changed insignificantly in the time increment that elapsed between the sampling by the second pair 425 and the sampling by the third pair 430.

For example, a representative time increment between the samplings by the second pair 425 and by the third pair 430 might be approximately $t_p/8$ or approximately 0.0125 seconds if the scanning reflector (not shown) completes a scanning cycle in approximately 0.1 seconds, that is, if the scanning reflector is swiveling at a frequency of approximately 10 Hertz. If for a given point in the image 410 the change in the collected amount of millimeter wave radiation is small during this time increment, then a cross-calibration can be done between the receiver in the second pair 425 and the receiver in the third pair 430 that viewed this given point in the image 410. For example, if for a given point in the image 410 the change in the collected amount of millimeter wave radiation during this time increment is less than approximately 1%, then a cross-calibration can be done between the receiver in the second pair 425 and the receiver in the third pair 430 that viewed this given point in the image 410.

By placing columns of receivers at points where the image motion is slowest (at the extremes of the scanning reflector angular motion), one can significantly increase the integration time for those specific angles and corresponding image regions, while placing another column of receivers at a point where the image motion is fastest will assure that this column of receivers will overlap the sampling of the same region of the image by a column of receivers that has a long integration time. Also, by increasing the number of strategically placed columns, as illustrated in going from FIG. 3 to FIG. 4, the required overall scan angle range can also thereby be reduced, thus relaxing the requirements on the angular drive for the scanning reflector.

Embodiments of the invention provide numerous benefits. This invention solves four problems. The first is the desire to sample the image at the focus of some collection optics at what is called Nyquist sampling (at twice the diffraction limited scene resolution of the optics). Second, it reduces the cost of the FPA by reducing the number of receivers in the array but still obtain the full Nyquist sampled image without adversely impacting image quality or resolution. Leaving out specific columns in a fully populated FPA reduces cost and assures that the gaps formed by the removed columns takes advantage of the changing rate at which the image moves (due to a sinusoidal motion of the scanning reflector, for example).

A fully populated FPA would have m rows and n columns of receivers that are arranged so that they are tightly placed against each other. If we take a simple Cartesian layout where the rows and columns are all in line relative to their neighbors, the columns can be numbered from 1 through N, where N is an even number. Then the even-numbered columns can be shifted by approximately half a pixel in the direction of the column, resulting in a staggering by a half-pixel of the alignment going along each row of receivers.

The resulting FPA is still fully populated. The FPA captures a snapshot of the image falling on it (which we may call Dataset 1). After the image shifts in the direction of the rows by a half pixel, the FPA captures a second snapshot of the image (which we may call Dataset 2). The two datasets can be combined to create a third dataset that represents a full Nyquist sampling of the image. This is so because in the direction of the image shift, the half-pixel motion provides the half-pixel sampling of the image, while the Nyquist sampling in the column direction is a result of the fact that the even columns are shifted in the column direction by a half-pixel relative to the adjacent odd numbered columns, and the combining of the two datasets for these two adjacent columns results in a half-pixel sampling of the image in both the column and row directions.

The cost of the FPA can be reduced if the number of receivers can be reduced in a way that still maintains the ability to Nyquist sample the image. To do this, at least one pair of adjacent odd and even columns are retained together. This single pair of columns could be used to view the entire image if the image were scanned across this single pair, but this may take more time than is acceptable. To reduce the time, two or more pairs of columns could be used, for example, a first column pair and a second column pair, with each pair comprising an adjacent odd and even column. For example, at least two pairs of adjacent columns are retained in the FPA, and as the image moves, data from the receivers are captured at times corresponding to half-pixel movements of the image. To assure full Nyquist sampling across the entire image, the image must move far enough so that a given region in the image that is sampled by a second column of the first column pair is imaged again by the first column of the second column pair. Any movement more than this will overlap the sampling more than necessary, and any movement less than this will leave regions of the image unsampled.

The gap between these column pairs can be varied. For example, the gap comprises the approximate width of an integral number of column pairs. For example, if the integer is 1, then there is an alternating pattern of pairs of receiver columns and a gap equivalent to the approximate width of a pair of columns. If the integer is 2, then the gap is equivalent to the approximate width of two pairs of receiver columns. In that event, the array is more sparse than when the integer is 1, with the pairs of receiver columns further apart from each other. FIG. 3 has a single integer 2 gap (two missing column pairs), while FIG. 4 has two integer 1 gaps. As described in the preceding paragraph, as the image moves, data from the receivers are captured at times corresponding to half-pixel movements of the image.

Third, by strategically spacing the pairs of receiver columns, one can increase the integration time in certain places in the FPA, for example, in a central portion of the image. Fourth, by allowing the odd (or even) receiver column in one column pair to sample the same point in the image that is sampled by the odd (or even) receiver column in an adjacent column-pair, one can do a cross-calibration of receivers to effect an improved uniformity of response to the image. These four problems are solved simultaneously by this invention.

It will be further understood by those of skill in the art that the number of variations of the invention and the like are virtually limitless. It is intended, therefore, that the subject matter in the above description shall be interpreted as illustrative and shall not be interpreted in a limiting sense.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain steps and certain components can be altered without substantially impairing the functioning of the invention.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the invention. It is intended, therefore, that the subject matter in the above description shall be interpreted as illustrative and shall not be interpreted in a limiting sense.

We claim:

1. An apparatus, comprising:
a focal plane array (FPA) of receivers for a passive millimeter wave camera, the FPA comprising:
receivers configured to sample an image, the image comprising one or more regions, the receivers arranged in an array of dimensions m rows by n columns, and
a scanning reflector configured to move, thereby moving an image of the scene across the FPA transverse to the receiver columns.

2. The apparatus of claim 1, wherein the array comprises a rectangular array.

3. The apparatus of claim 1, wherein the receivers are positioned with a substantially uniform pitch.

4. The apparatus of claim 1, wherein respective positions of two or more of the receivers in the array are staggered.

5. The apparatus of claim 1, wherein the scanning reflector comprises one or more of a scanning mirror, a scanning twist reflector, a swivel plate, a rotating plate, and a Risley pair.

6. The apparatus of claim 1, wherein in selected receiver columns, the receivers are shifted over by an incremental fraction of the FPA pitch known as the pixel fraction.

7. The apparatus of claim 1, wherein in selected receiver columns, the receivers are shifted over in the direction of the column by an incremental fraction of the FPA pitch known as the pixel fraction.

8. The apparatus of claim 1, wherein the pixel fraction comprises one or more of a tenth of a pixel, a quarter pixel, a third of a pixel, and a half pixel.

9. The apparatus of claim 1, wherein one or more receiver columns is removed from the FPA, thereby creating a sparsely populated array.

10. The apparatus of claim 9, wherein to fill in information regarding the image that would otherwise be lost due to the removed receiver columns, the scanning reflector moves the image moves back and forth so that one or more receiver columns sample the image.

11. The apparatus of claim 9, wherein by adjusting an angle through which the scanning reflector moves the image, certain pixels in at least two different receiver columns will sample the same region of the image twice, thereby increasing an integration time.

12. The apparatus of claim 11, wherein the apparatus performs a full Nyquist sampling of the image.

13. The apparatus of claim 12, wherein one or more receiver columns is removed from the FPA, thereby creating a sparsely populated array.

14. The apparatus of claim 9, wherein at least one pair of adjacent columns is retained in the FPA.

15. The apparatus of claim 9, wherein at least two pairs of adjacent columns are retained in the FPA, and wherein as the image moves, a given point in the image that is sampled by a second column of the first column pair is imaged again by the first column of the second column pair.

16. The apparatus of claim 15, wherein the apparatus performs a full Nyquist sampling of the image.

17. The apparatus of claim 1, wherein the image moves in a pattern that comprises one or more of a sinusoidal pattern, a triangular pattern, a square pattern, and a step-stare pattern.

18. The apparatus of claim 17, wherein two receivers are positioned at a point at which the scanning reflector reverses a direction of motion, thereby maximizing an integration time.

19. The apparatus of claim 18, wherein the scanning reflector is configured so that the two receivers both sample the same region of the image.

20. The apparatus of claim 19, wherein the two receivers sample the same region of the image at two times that are close to each other in time so that the region of the image sampled does not change significantly between the two samplings.

21. The apparatus of claim 19, wherein the apparatus is configured to use the sampling of the same region of the image by the two receivers to perform a cross-calibration of the two receivers to help with one or more of calibration and image uniformity.

22. The apparatus of claim 1, wherein in alternating receiver columns, the receivers are shifted over by approximately half a pixel.

\* \* \* \* \*